No. 671,900. Patented Apr. 9, 1901.
H. B. STANERT.
SUSPENDING DEVICE FOR POULTRY.
(Application filed May 10, 1900.)
(No Model.)
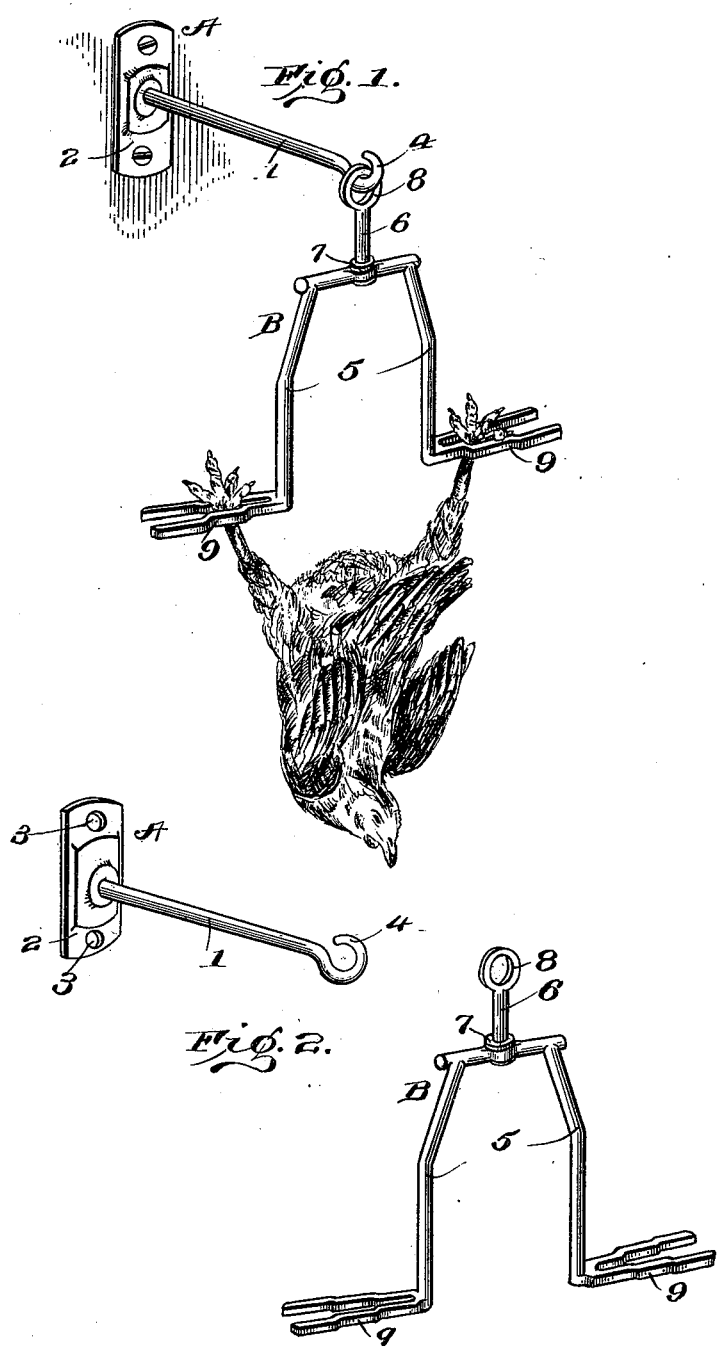
Witnesses
E. W. Hart
Ralph S. Warfield
Inventor
Henry Bennett Stanert
by Rhesa G. DuBois & Co.
his Attorneys

UNITED STATES PATENT OFFICE.

HENRY BENNETT STANERT, OF PHILADELPHIA, PENNSYLVANIA.

SUSPENDING DEVICE FOR POULTRY.

SPECIFICATION forming part of Letters Patent No. 671,900, dated April 9, 1901.

Application filed May 10, 1900. Serial No. 16,213. (No model.)

*To all whom it may concern:*

Be it known that I, HENRY BENNETT STANERT, a citizen of the United States of America, residing at Philadelphia, in the county of Philadelphia and State of Pennsylvania, have invented certain new and useful Improvements in Suspending Devices for Poultry, of which the following is a specification.

My invention relates to suspending devices for poultry, and has for its object the easy manipulation of the chicken, duck, turkey, or other fowl during the plucking of the same. Heretofore commonly it has been the practice to hold the fowl with one hand, while removing its feathers with the other; but by the use of my improved device both hands may be used to pick the fowl, and a much neater and quicker operation is the result.

My invention consists of a bracket upon which is hung the holder composed of a yoke, the lower or free ends of which are provided with forks having graduated tines for receiving the feet and legs of a fowl.

It also consists in certain other novel features of construction and combinations of parts, all of which will be more fully described hereinafter and particularly pointed out in the claim.

In the accompanying drawings, Figure 1 is a perspective view of my device in position for use, and Fig. 2 is a view showing the parts disconnected.

A represents a bracket, which consists of a shank 1, provided at one end with a plate 2, and through said plate holes 3 3 are formed for securing the bracket to a suitable support. At the opposite end of the shank a hook 4 is formed, the outer portion of said hook being curved nearly in a circle, so as to leave but a slight opening for the entrance of the holder. This holder is composed of a yoke B, provided with depending arms 5 5, diverging from the center of the yoke in a general oblique direction. The center of the yoke is enlarged, and an orifice is formed therein, through which the shank 6 is secured by a swivel connection 7, which supports the yoke and allows it to rotate thereon. The opposite end of said shank is formed into an eyelet 8, adapted to receive the hook 4 of the bracket. To the outer or free ends of the depending arms 5 5 are rigidly secured forks 9 9, provided with graduated tines. These forks incline upwardly at a slight angle to the arms 5 5, thus preventing the accidental disengagement of the legs of a fowl secured therein. The legs of the fowl are placed between these graduated tines, the feet preventing them from slipping out and causing the fowl to be held in an inverted position during plucking, meanwhile keeping the legs separated from one another to facilitate the plucking. This device might also be used when it is desired to kill the bird, which after being decapitated may be hung up in the manner illustrated, thus permitting the blood to drain out of the body instead of allowing the headless trunk to flop around on the ground, scattering blood upon everything around, as well as over itself, injuring the appearance of the fowl and making the plucking disagreeable.

During the plucking operation the holder may be revolved on the swivel as desired, thus turning the body in front of the operator and presenting a new point from which to remove the feathers.

It is evident that slight changes might be made in the form and arrangement of the several parts described without departing from the spirit and scope of my invention, and hence I do not desire to limit myself to the exact construction herein set forth; but, Having fully described my invention, what I claim as new, and desire to secure by Letters Patent, is—

The combination with a supporting means, of a yoke provided with a swiveled shank engaging said supporting means, rigid divergent arms depending from said yoke the free ends of said arms being bent outwardly and provided with forks having graduated tines.

In testimony whereof I have signed my name to this specification in the presence of two subscribing witnesses.

HENRY BENNETT STANERT.

Witnesses:
JOSEPH P. BALL,
JOSEPH BALL.